(12) United States Patent
Krehmer

(10) Patent No.: US 10,166,831 B2
(45) Date of Patent: Jan. 1, 2019

(54) DEVICE FOR ADJUSTING THE HEIGHT OF A VEHICLE BODY

(71) Applicant: Schaeffler Technologies AG & Co. KG, Herzogenaurach (DE)

(72) Inventor: Hartmut Krehmer, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 181 days.

(21) Appl. No.: 15/303,097

(22) PCT Filed: Feb. 27, 2015

(86) PCT No.: PCT/DE2015/200109
§ 371 (c)(1),
(2) Date: Oct. 10, 2016

(87) PCT Pub. No.: WO2015/154763
PCT Pub. Date: Oct. 15, 2015

(65) Prior Publication Data
US 2017/0028805 A1   Feb. 2, 2017

(30) Foreign Application Priority Data
Apr. 10, 2014 (DE) .......................... 10 2014 206 938

(51) Int. Cl.
*B60G 17/00* (2006.01)
*B60G 11/16* (2006.01)
(Continued)

(52) U.S. Cl.
CPC .............. *B60G 17/00* (2013.01); *B60G 11/16* (2013.01); *B60G 13/006* (2013.01); *B60G 15/063* (2013.01); *B60G 15/07* (2013.01); *B60G 17/021* (2013.01); *F16H 25/2454* (2013.01); *B60G 2202/312* (2013.01); *B60G 2202/42* (2013.01); *B60G 2204/1242* (2013.01);
(Continued)

(58) Field of Classification Search
CPC ...... B60G 17/00; B60G 11/16; B60G 13/006; B60G 15/063; B60G 15/07; B60G 17/021; F16H 25/2454
See application file for complete search history.

(56) References Cited

U.S. PATENT DOCUMENTS

| 4,079,922 A | 3/1978 | Nicholls |
| 2016/0221410 A1 | 8/2016 | Mersmann et al. |

FOREIGN PATENT DOCUMENTS

| DE | 2624087 | 12/1976 |
| DE | 10237809 | 3/2004 |

(Continued)

*Primary Examiner* — Zakaria Elahmadi
(74) *Attorney, Agent, or Firm* — Volpe and Koenig, P.C.

(57) ABSTRACT

A device for adjusting the height of a vehicle body, containing a movement thread, which is arranged between the vehicle body and a wheel carrier. The movement thread has two threaded parts that can be rotated in relation to each other, which are formed by a spindle and a spindle nut, and a locking apparatus, which bridges the movement thread at at least two axial positions in a positive-locking manner and which has a locking sleeve having locking stops arranged over the periphery at different axial positions. The device is characterized in that the locking sleeve is modularly formed of a stack of at least one locking element containing locking stops and groove sections and at least one intermediate element containing only groove sections.

11 Claims, 3 Drawing Sheets

(51) Int. Cl.
  *B60G 13/00*  (2006.01)
  *B60G 15/06*  (2006.01)
  *B60G 15/07*  (2006.01)
  *B60G 17/02*  (2006.01)
  *F16H 25/24*  (2006.01)
  *F16H 25/22*  (2006.01)

(52) U.S. Cl.
  CPC .................. *B60G 2204/419* (2013.01); *B60G 2204/4191* (2013.01); *B60G 2204/42* (2013.01); *B60G 2204/44* (2013.01); *B60G 2500/30* (2013.01); *F16H 25/2204* (2013.01)

(56) References Cited

FOREIGN PATENT DOCUMENTS

| | | |
|---|---|---|
| DE | 102006001708 | 8/2007 |
| DE | 102010017352 | 12/2011 |
| DE | 102014206142 | 2/2015 |
| EP | 1953013 | 8/2008 |
| EP | 2236324 | 1/2010 |
| EP | 2332756 | 6/2011 |
| WO | 2010089581 | 8/2010 |
| WO | 2015021952 | 2/2015 |

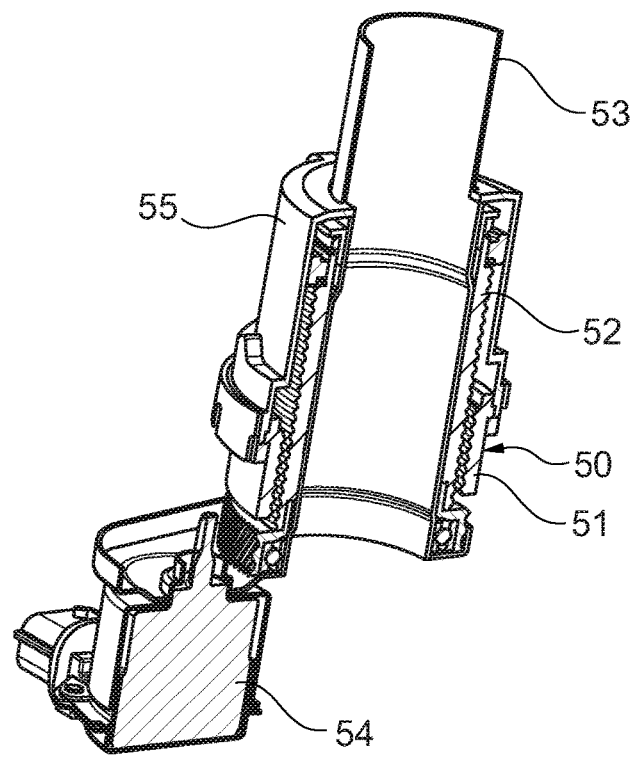
Fig. 4
(Prior Art)
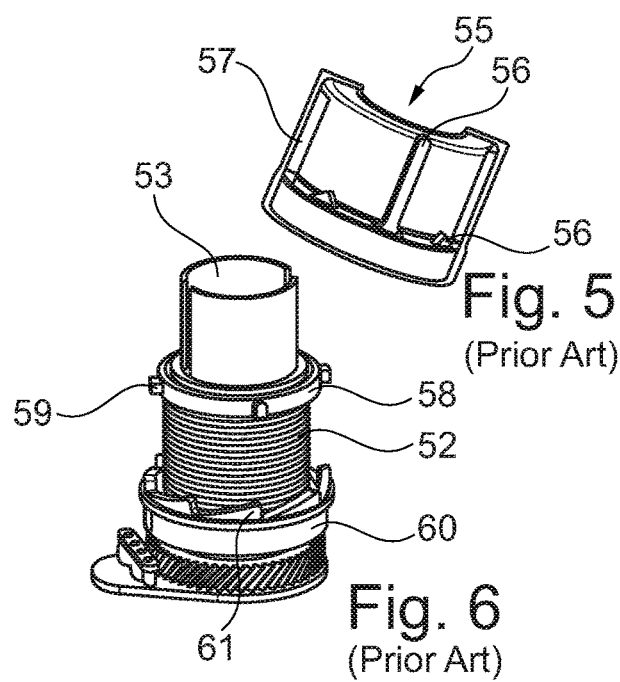
Fig. 5
(Prior Art)
Fig. 6
(Prior Art)

DEVICE FOR ADJUSTING THE HEIGHT OF A VEHICLE BODY

BACKGROUND

The invention relates to a device for adjusting the height of a vehicle body.

Devices for adjusting the height of vehicle bodies are provided on the suspension struts of motor vehicles, in particular, for increasing the ground clearance of motor vehicles or, in the event of flat road surfaces, for reducing the ground clearance in order to improve the aerodynamic properties. Here, for example, according to EP 2 332 756 A2, height adjustment is provided between a mount of the suspension strut and an upper spring plate of a pretensioned spring of the suspension strut or, as known from EP 1 953 013 A2, between a component holding a wheel carrier, such as a sleeve part, and a lower spring plate. Such devices are actuated, for example, by an electric motor that rotationally drives a movement thread, for example, a spindle drive or ball spindle drive, so that, from the rotational movement, for example, a rotationally locked and axially displaceable spindle and a rotationally driven, axially fixed spindle nut carries out an axial displacement of a fixed component relative to a component of the suspension strut that can be axially displaced relative to this part and thus an essentially continuous height adjustment of the suspension strut and thus the vehicle body is achieved with a corresponding adjustment of the ground clearance between an upper and a lower adjustment position. In this arrangement, impacts absorbed by the wheel mounted on the suspension strut have a negative effect on the movement thread, in particular, on the balls and raceways of a ball screw drive.

From DE102014206142 A1, a known device is disclosed. The movement thread is bridged with a positive fit by a locking device. Here, for example, a locking ring with control cams is held so that it can rotate and is axially fixed on the spindle of the movement thread. The control cams are guided in guide grooves of a guide sleeve that is connected to the spindle nut and is designated below as a locking sleeve. The locking ring is rotated step by step after the locking cams leave the guide grooves by a ramp ring arranged axially fixed on the spindle nut for relative displacements between the locking ring and spindle nut in the sense of a ballpoint pen principle.

When the locking cams are lowered onto the locking stops, an axially positive-fit stop bridging the movement thread is formed. Here, the locking sleeve is provided in one piece with molded locking stops and guide grooves, so that these must each be designed separately for each application and according to customer requirements.

SUMMARY

The object of the invention is the advantageous refinement of a device for adjusting the height of a vehicle body, whose locking sleeve can be economically adapted to different applications.

The objective is achieved by the subject matter of the invention. Advantageous embodiments of the invention are discussed below.

The proposed device is used for adjusting the height of a vehicle body and is arranged, for example, on a suspension strut of a motor vehicle between the vehicle body and a wheel carrier.

The devices according to the invention have a locking sleeve with a modular construction.

The device according to the invention contains a movement thread with two thread parts that are supported so that they can rotate relative to each other in the form of a spindle and a spindle nut. Here, one thread part—spindle or spindle nut—is rotationally driven by a rotary drive such as, for example, by an electric motor by a belt, chain, gear drive or the like and held axially fixed in a housing allocated to a component. The other thread part is supported rotationally locked and axially displaceable relative to the first thread part, so that an axial displacement of the components can be provided for a rotary drive.

For protecting the movement thread, a locking device bridging the movement thread with a positive fit is provided. In a locking position, forces can be transferred between the vehicle body and the wheels via the locking device. Forces are removed from the movement thread. In particular, for the use of ball screw drives as the movement thread, forces are removed from the balls that are arranged so that they can roll on ball grooves of the spindle nut and the threaded spindle.

Here, for example, a locking ring with control cams is held so that it can rotate and is fixed axially on the spindle of the movement thread. The control cams can be guided in guide grooves of a locking sleeve connected to the spindle nut. The locking ring can be rotated step by step after the locking cams leave the guide grooves by a ramp ring arranged axially fixed on the spindle nut for relative displacements between the locking ring and spindle nut in the sense of a ballpoint pen principle.

The locking sleeve can have locking stops that are arranged distributed over its circumference and at different axial positions and are provided with guide grooves of different lengths. This locking sleeve can be connected, for example, axially fixed in position with a lower spring plate of a damper tube. According to which of the locking stops arranged at different axial levels are effective, a corresponding height level of the vehicle body is set relative to the road surface.

The locking sleeve has, according to the invention, a modular construction made from a stack of at least one locking element containing locking stops and groove sections and at least one intermediate element containing exclusively groove sections.

The intermediate element can be used as a spacer between locking elements arranged axially one behind the other, wherein the groove sections can form guide grooves of the locking sleeve and can lead to the locking sections. In other words, the feature that the intermediate element contains exclusively groove sections means that the intermediate element has no locking stops.

Alternatively, only locking elements could be used. Through corresponding arrangement of individual or multiple locking elements and intermediate elements, multiple locking stops could be provided, specific to the application, at multiple axial positions along an adjustment path of the movement thread. Here, the movement gear could be largely freely selectably bridged by axial positive fit connections between a lower adjustment position for a minimum height adjustment and an upper adjustment position for a maximum height adjustment of the vehicle body with respect to the road surface. Here, preferably two to three axial positions or alternatively multiple positions could be formed by an axial positive fit connection whose absolute distances from each other can be formed as a function of the number of intermediate elements being used. The number of axial positions depends essentially on the number of locking elements being used.

The locking elements can preferably have two or three locking stops and groove sections distributed over the circumference. The intermediate elements contain exclusively groove sections. The groove sections here are used according to the orientation of the locking element for the formation of guide grooves of different lengths relative to the corresponding locking stops in which, for example, one or more groove sections are connected in front of a locking stop of a locking element.

It has proven advantageous to form the stack made from locking elements and intermediate elements as identical parts independent of their application, so that, in a cost-saving way, for example, for a locking sleeve with locking stops arranged on two or three axial positions, only one type of locking element and intermediate element is needed for a large variety of differently constructed locking sleeves.

In an especially advantageous way, locking elements and intermediate elements can be formed from identical parts, wherein the locking stops of the locking elements are arranged at positions that need no groove sections in this locking ring. Preferably, the locking and intermediate elements have a ring-shaped construction. In other embodiments, other component shapes, such as split rings and the like, could be provided, in order, for example, to save material costs.

The locking and intermediate elements are preferably stamped from sheet metal, wherein the groove sections and locking stops could be stamped and molded off the tool. Furthermore, the intermediate and locking elements could be constructed as castings, sintered parts, or as injection molded parts.

The connection of the intermediate and locking elements to a stack forming the locking sleeve can be provided with material bond and/or positive fit connections. For example, these can be welded to each other, swaged, and/or connected to each other by means of latch or bayonet connections.

In one advantageous embodiment, the at least one locking element and the at least one intermediate element are placed at a common axial position on a three-part division of the locking stops. This means that three locking stops distributed preferably equally over the circumference forms a stable support for three corresponding control cams of the locking ring distributed accordingly over the circumference. A different number of locking stops can be provided to a common axial position.

If, with a three-part division, locking stops are to be provided at two different axial positions, one locking element preferably contains three locking stops distributed equally over the circumference and a groove section arranged between each of these, as well as an intermediate element has six groove sections distributed equally over the circumference. Here, two locking elements rotated by 60° are provided, wherein axially between these, zero, one, or multiple intermediate elements can be arranged and these rings forming the stack are connected rigidly to each other. In one alternative embodiment, for an axial loading of the rings on each other, an axial plug connection can also be sufficient.

To exclude an incorrect position of the locking and intermediate elements relative to each other, an axially raised positioning tab can be provided on a locking element and an intermediate element on one end side and, on the opposite end side, a positioning groove rotated by 60° relative to the positioning tab, wherein these parts, when joined together, provide the specified positions of locking stops and groove sections aligned in the circumferential direction.

In another advantageous embodiment, three different axial positions of locking stops can each be provided in three-part division. Here, a locking element has three locking stops distributed over the circumference and two groove sections arranged between these stops and the intermediate element has nine groove sections distributed equally over the circumference. A stack forming the locking sleeve is here formed from three locking elements each with at least one intermediate element arranged between two locking elements. Here, the number of intermediate elements being determines the axial distance of the three positions of locking stops from each other.

For the unique positioning of the locking and intermediate elements in the circumferential direction, an axially raised positioning tab can be provided on one of the end sides of these elements and a positioning groove rotated by 40° relative to the positioning tab can be provided on its opposite end side. For the construction of three different axial positions of locking stops, successive switching between switchable locking states can be provided by moving the locking ring against the ramp ring while reversing the direction at the locking stops either in the sequence with the small, medium, and large distance to the ramp ring or with the small, large, and medium distance to the ramp ring. The corresponding sequence is achieved through corresponding rotation of the axially successive locking elements relative to each other.

It is understood that the locking and intermediate elements provided for forming three axially different positions of locking stops can be provided for a two-stage locking device. Here, free guide grooves or a redundant axial position of locking stops, for example, a sequence of high-low-empty, high-low-high, are produced at the three switch positions.

The locking device can contain a locking ring that is mounted so that it can rotate and is axially fixed on the spindle with control cams arranged distributed over the circumference. The control cams operate together with the locking stops of the locking sleeve.

The spindle nut, a ramp ring, and the locking sleeve can also be arranged axially immovable relative to each other in the axial adjustment directions of the device according to the invention.

For a rotationally locked spindle nut and a rotationally driven spindle, the switching ramps and the locking sleeve can be connected rigidly to the spindle nut.

For a rotationally driven spindle nut, the switching ramps and the locking sleeve can be supported relative to the spindle nut in the axial direction, but the spindle nut can rotate about the spindle axis relative to the switching ramps and the locking sleeve. The spindle nut, the locking sleeve, and a ramp ring carrying the switching ramps can be housed in a common housing; in this case, the spindle nut is supported so that it can rotate in the housing.

For a rotationally driven spindle, the ramp ring can be arranged preferably rotationally locked on the spindle nut with the rising switching ramps distributed over the circumference and the locking sleeve.

For a rotationally driven spindle nut, the ramp ring and the locking sleeve can be arranged axially immovable and rotatable relative to the spindle nut.

It is understood that, in an upper locking position at the maximum height adjustment, the guide groove can be negligibly short and the control cams can contact directly on the locking stop. The control cams are guided during the function of the movement thread in guide grooves, preferably in the guide grooves of the locking stops, and are stored for forming an axial positive-fit connection for bridging the movement thread on the locking stops. Here, the control cams are oriented in the sense of a ballpoint pen principle through the displacement of the locking ring against the ramp ring and rotation of the locking ring on the ramp ring to the guide grooves leading to the locking stops or the locking stops with specified axial position. For a reversal of the rotational direction, the control cams track, according to their orientation into the guide grooves for forming an axially displaced positive fit connection on axially farther distanced locking stops or directly form an axial positive fit connection with the closest locking stops.

BRIEF DESCRIPTION OF THE DRAWINGS

The invention will be explained in more detail with reference to two embodiments shown in a total of 8 figures. Shown are.

DETAILED DESCRIPTION OF THE PREFERRED EMBODIMENTS

FIGS. 4 to 8 show devices that are part of the prior art for adjusting the height of a vehicle body; these figures are taken from DE102014206142 A1. These devices are described below as far as they are useful for understanding the present invention. These devices are refined by the modular locking sleeve according to the invention described farther below to form the present invention.

Figure 2:
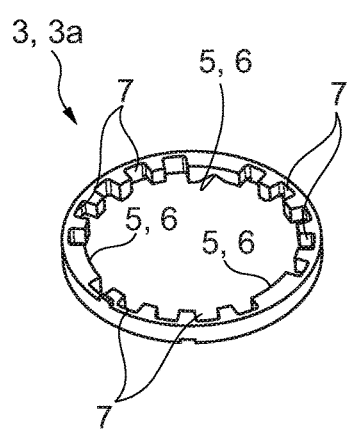
Figure 3:
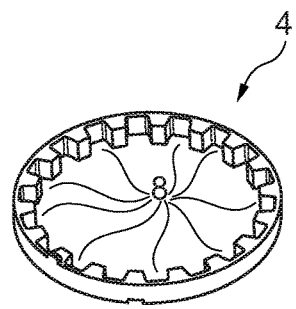

FIGS. 4 to 6 show an embodiment that corresponds to FIGS. 2 and 3 of DE102014206142 A1. This device for adjusting the height of a vehicle body is provided with a movement thread 50 arranged between the vehicle body (not shown) and a wheel carrier (not shown), which has a spindle nut 51 and a spindle 52. The movement thread 50 is formed by a known ball screw drive.

FIGS. 4 and 6 show a damper tube 53 that is held on the wheel carrier side and on which the device according to the invention is arranged in this embodiment.

An electric motor 54 drives the spindle 52 into rotation. The spindle 52 is arranged in the embodiment so that it can rotate relative to the damper tube 53, but is not axially shifted with respect to the damper tube 53.

The spindle nut 51 that is arranged rotationally locked and axially movable relative to the damper tube 53 is shifted along the spindle axis under the rotating spindle 52. The spindle nut 51 is housing in a housing that is not shown here and carries a lower spring plate of a suspension strut.

A locking sleeve 55 is supported immovable on the spindle nut 51. FIG. 5 shows the locking sleeve 55 in a partial section. Locking stops 56 that are arranged distributed over the circumference in axially different positions can be clearly recognized. According to the axial position, the locking stops 56 contact guide grooves 57 of different lengths. The locking sleeve 55 is also housed in this example in the not-shown housing.

A locking ring 58 is supported axially immovable and rotatable on the spindle 52. The locking ring 58 carries multiple control cams 59 that are arranged distributed over the circumference and engage in allocated guide grooves 57 according to their rotational position with respect to the locking sleeve 55 and axially contact the locking stops 56 with axial displacement of the locking ring 58 relative to the locking sleeve 55. Consequently, the locking ring 58 can contact the allocated locking stops 56 at different axial positions.

A ramp ring 60 is arranged immovable relative to the locking sleeve 55 and can also be housed in the not-shown housing. The ramp ring 60 is provided on its end side facing the locking sleeve 55 with switching ramps 61 that are arranged distributed over the circumference and interact with the control cams 59 of the locking ring 58 during a switching process, in order to switch from an axial position of the locking ring 58 into a different axial position of the locking ring 58.

Under corresponding rotational actuation of the spindle 52, the spindle nut 51 moves together with the ramp ring 60 and the locking sleeve 55 relative to the spindle 52 and thus relative to the locking ring 58, wherein the locking ring 58 is axially displaced in the direction toward the ramp ring 60. When the control cams 59 of the locking ring 58 are finally disengaged from the guide grooves 57 of the locking sleeve 55, they come into sliding contact with the switching ramps 61 on which they slide, with rotation of the locking ring 58, up to the next switching ramp 61 at whose high end another rotation ends. In this position, a reversal of the direction of rotation of the rotary drive takes place and the locking sleeve 55 moves axially downward in the figure. The switching cams 59 now track into the newly approached guide grooves 57 and finally contact the allocated locking stops 56 in the newly selected axial position. The vehicle body now has a changed height level with respect to the road surface.

If one considers the relative movement between the locking sleeve 55 and locking ring 58, the locking ring 58 is displaced in the direction toward the locking sleeve 55 and engages there in guide grooves 57 that have, at their upper end, a different locking stop 56 in a different axial position. When the control cams 59 contact the controlled locking stops 56, a different height level is set.

The locking ring 58 is supported axially immovable and rotatable on the spindle 52 and the spindle 52 is supported so that it can rotate but is axially immovable on the damper tube 53.

The spindle nut 51 carries the locking sleeve 55 and moves together with the not-shown lower spring plate under rotational actuation of the spindle 52 in the axial direction relative to the spindle 52 that carries the locking ring 58.

In the described locking positions, the weight of the vehicle body is guided via the lower spring plate and the housing into the locking sleeve 55 and from there farther via the control cams 59 of the locking ring 58 into the spindle 52 and the damper tube 53 up to the wheel carrier.

In the case of the preferred ball screw drive as the movement thread, forces are consequently removed from the balls in the locking positions described above. In other words, the locking device bridges the ball screw drive in the axial positions defined by the locking positions. The balls of the ball screw drive are loaded by the full weight of the vehicle body only during the actuation of the ball screw drive.

Figure 7:
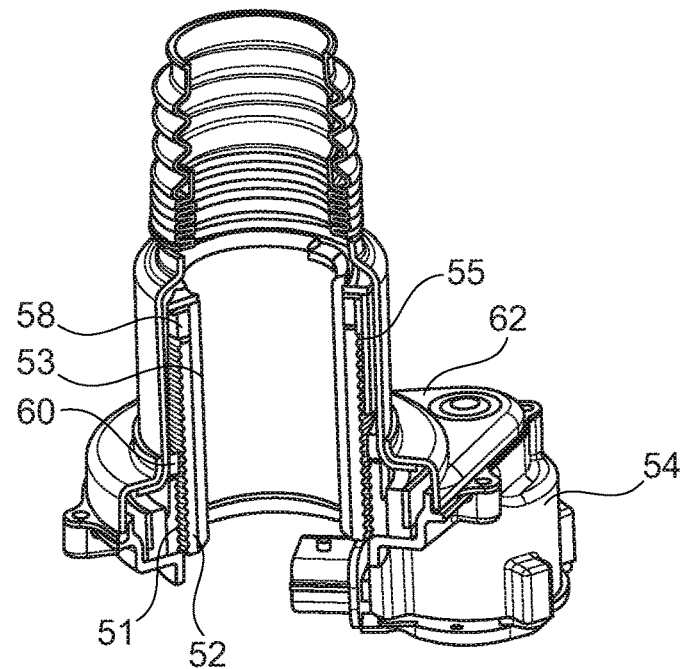
Figure 8:
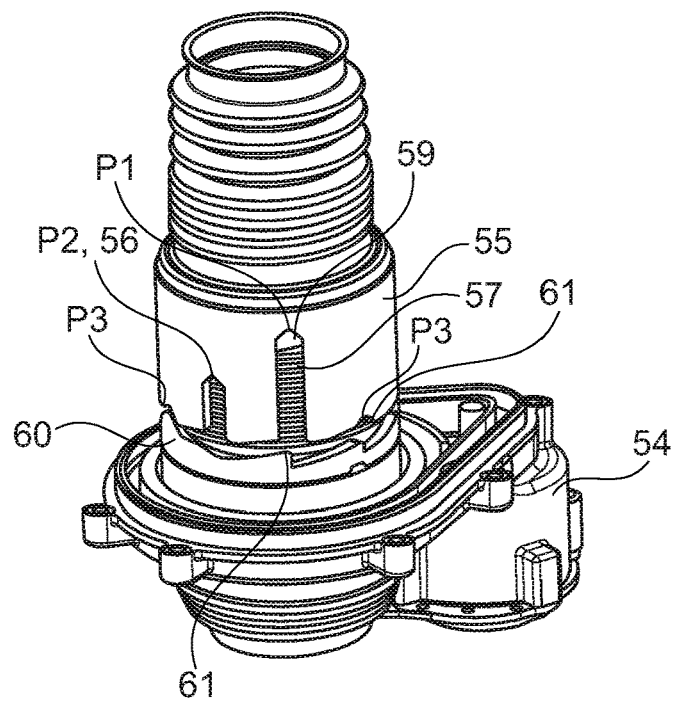

FIGS. 7 and 8 show an embodiment that largely corresponds to FIGS. 9 and 10 of DE 102014206142 A1. The essential difference to the previously described embodiment consists in that the spindle nut 51 is rotationally driven and the spindle 52 is stationary.

While in the previously described embodiment the housing with the electric motor is axially immovable with respect to the damper tube, in the variant according to FIGS. 7 and 8, the electric motor 54 is displaced together with the housing 62 and with the rotating spindle nut 51 and the not-shown lower spring plate relative to the damper tube 53 and relative to the spindle 52.

FIG. 7 shows an opened housing 62 that holds the electric motor 54 and the locking sleeve 55 and the ramp ring 60. The locking sleeve 55 and the ramp ring 60 can be clearly seen in the representation in FIG. 8 in which the housing is not shown.

FIG. 8 clearly shows three locking positions P1, P2, P3 that can be approached in order to be able to set three different level positions of the vehicle body relative to the road surface.

The rotationally driven spindle nut 51 is supported so that they can rotate in the housing 62 by means of not shown axial bearings. During the adjustment of the height level, the weight of the vehicle body is guided via the housing 62 into the spindle nut 51, wherein the axial bearings transfer this force. The weight is guided from the spindle nut 51 via the not-shown balls of the ball screw drive into the spindle 52 and from there into the damper tube 53.

FIG. 7 shows, in section, the locking ring 58 that is supported so that it is axially immovable but rotatable on the spindle 52 as in the previously described embodiment. The control cams 59 of the locking ring 58 are clearly shown in FIG. 8, wherein the representation shows a set locking position P1 in which the vehicle body has assumed its lowest position.

The interaction of locking sleeve 55, ramp ring 60, and locking ring 58 is the same as the interaction of these components in the embodiment according to FIGS. 4 to 6. Also in the previously described embodiment, the weight of the vehicle body is guided in the locking positions via the locking sleeve and the locking ring into the spindle and finally into the damper tube.

In both embodiments, two component groups are formed whose components are arranged axially immovable relative to each other: the first component group is formed by the damper tube, the spindle, and the locking ring. The second component group is formed by the housing, the spindle nut, the locking sleeve, and the ramp ring.

In both embodiments, the interaction of the locking sleeve, the locking ring, and the ramp ring is the same.

These embodiments described above are included by the present invention according to which the known locking sleeve is replaced by the modular locking sleeve described below and can be held easily in the housing of the device.

Figure 1:
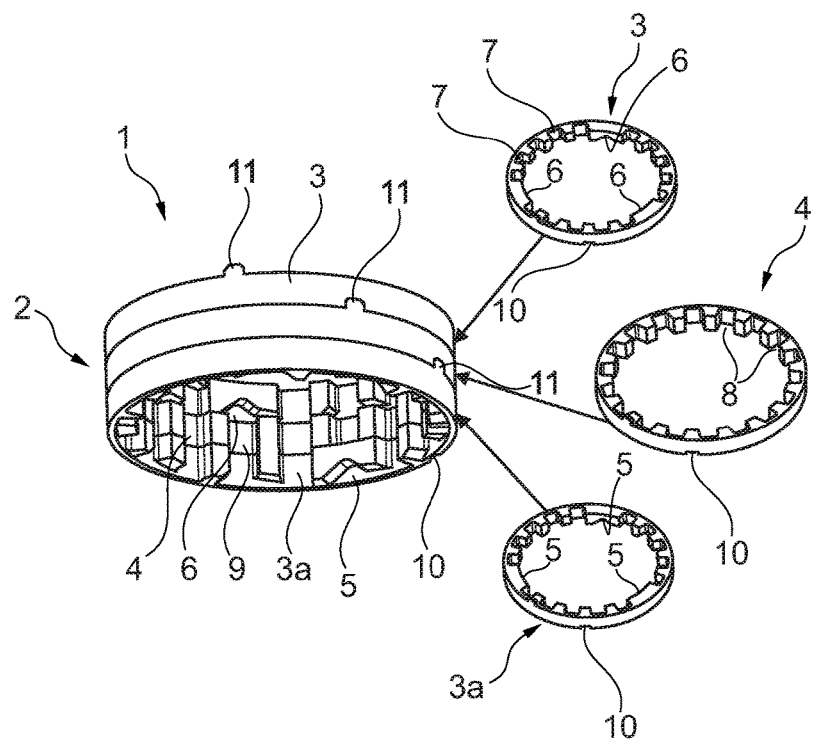
FIG. 1 a locking sleeve formed partially from a stack of locking and intermediate elements in one view, FIG. 2 a locking element in one view, FIG. 3 an intermediate element in one view, FIG. 4 a device that is part of the prior art, FIG. 5 an individual part from FIG. 4 in sectional view, FIG. 6 additional components of the device according to FIG. 4, FIG. 7 another device that is part of the prior art, and FIG. 8 the device from FIG. 7, but without upper housing.

FIG. 1 shows the stack 2 for producing the locking sleeve 1 made from two locking elements 3 and an intermediate element 4 in a 3D view. Here, two locking stops 5, 6 formed by the two locking elements 3 at different axial positions can be seen, which are each offset relative to each other by 60°. The locking elements 3 and the intermediate elements 4 are designed with a three-part division on a three-part locking sleeve 1. Here, the locking elements 3 provide three locking stops 5, 6 arranged at a spacing of 120° and between these two groove sections 7 arranged at a spacing of 40°. The intermediate element 4 provides nine groove sections 8 that form guide grooves 9 with the groove sections 7 of the locking element 3a relative to the locking stops 6. The guide grooves are eliminated at the locking stops 5 arranged directly at the end sides of the locking sleeve 1.

For forming the locking sleeve 1 with three locking stops 5, 6 spaced apart axially from each other, at least one additional intermediate element 4 and one locking element 3 is joined in this sequence to the stack 2. Here, locking stops distributed at a spacing of 120° over the circumference are provided at three axial positions. If the two-stage disassembly step is to be maintained, the locking stops 5 are provided at the positions 0°, 120°, and 240° and the locking stops 6 are provided at the positions 60°, 180°, and 300°.

In a way that is not shown, a two-stage locking sleeve can also be provided with locking elements with locking stops and groove sections alternating at a spacing of 60° and with intermediate elements with groove sections arranged at a spacing of 60°. In addition, locking stops with different axial heights can be provided alternating over the circumference in one locking element.

The locking elements 3 and the intermediate element 4 provide, for the exact setting of the rotational position relative to each other, a positioning tab 11 arranged on the end side and a positioning groove 10 that is rotated relative to this tab by 40° or 60° for setting two axially displaced stops and is designed complementary on the opposing end side.

FIG. 2 shows the locking elements 3, 3a provided as identical parts for a three-part locking device in a 3D view with three locking stops 5, 6 arranged distributed over the circumference and two groove sections 7 arranged between these stops.

FIG. 3 shows the intermediate element 4 with groove sections 8 distributed uniformly over the circumference in a 3D view.

LIST OF REFERENCE NUMBERS

1 Locking sleeve
2 Stack
3 Locking element
3a Locking element
4 Intermediate element
5 Locking stop
6 Locking stop
7 Groove section
8 Groove section
9 Guide groove
10 Positioning groove
11 Positioning tab
50 Movement thread
51 Spindle nut
52 Spindle 52
53 Damper tube
54 Electric motor
55 Locking sleeve
56 Locking stops
57 Guide grooves
58 Locking ring
59 Control cam
60 Ramp ring
61 Switching ramp
62 Housing

The invention claimed is:

1. A device for adjusting a height of a vehicle body, comprising a movement thread adapted to be arranged between the vehicle body and a wheel carrier, with two thread parts that are rotatable relative to each other and are formed from a spindle and a spindle nut, a locking device bridging the movement thread in at least two axial positions with a positive lock, including a locking sleeve with locking stops arranged over a circumference at different axial positions, the locking sleeve has a modular construction formed from a stack including at least one locking element containing locking stops and groove sections and at least one intermediate element containing exclusively groove sections.

2. The device according to claim 1, wherein multiple ones of the locking elements and the intermediate elements are formed as identical parts.

3. The device according to claim 1, wherein the at least one locking element and the at least one intermediate element each have a ring-shaped construction.

4. The device according to claim 1, wherein the at least one locking element and the at least one intermediate element are placed at an axial position on a three-part division of the locking stops.

5. The device according to claim 4, wherein for two different axial positions on one of the locking elements, three locking stops are distributed equally over the circumference and a groove section arranged between said stops, and six groove sections distributed equally over the circumference on the intermediate element.

6. The device according to claim 5, wherein for forming the locking sleeve with two of the locking stops arranged at different axial positions in a three-part division, two of the locking elements are rotated by 60° and one of the intermediate elements arranged axially between said locking elements, and the locking elements and the intermediate element are connected to each other.

7. The device according to claim 5, wherein the locking element and the intermediate element have, on one end side, an axially raised positioning tab and on an opposite end side, a positioning groove rotated by 60° relative to the positioning tab.

8. The device according to claim 4, wherein for three different axial positions on the locking element, three of the locking stops are distributed over the circumference and two of the groove sections are arranged between said stops and nine of the groove sections are distributed equally over the circumference on the intermediate element.

9. The device according to claim 7, wherein the locking element and the intermediate element have, on one end side, an axially raised positioning tab and on an opposite end side a positioning groove rotated by 40° relative to the positioning tab.

10. The device according to claim 1, wherein the locking device includes:
   a locking ring that is held so it is rotatable and is axially fixed on the spindle with control cams arranged distributed over the circumference,
   a ramp ring arranged axially fixed on the spindle nut,
   and the locking sleeve is held axially fixed on the spindle nut and is provided with the locking stops arranged over the circumference at different axial positions with guide grooves of different lengths, wherein the control cams are oriented by displacement of the locking ring against the ramp ring and rotation of the locking ring on the ramp ring on the locking stops of specified axial position and for a reversal of a direction of rotation between spindle and spindle nut the control cams track into the guide grooves and form an axial positive fit connection with the locking stops.

11. The device at least according to claim 10, wherein the locking elements are arranged successively in the circumferential direction with small, medium, and large spacing or with small, large, and medium spacing relative to the ramp ring.

* * * * *